May 27, 1969     G. A. COLLIER     3,446,217
AUTOMATIC CAR WHEEL WASHING APPARATUS
Filed Sept. 26, 1967     Sheet _1_ of 2
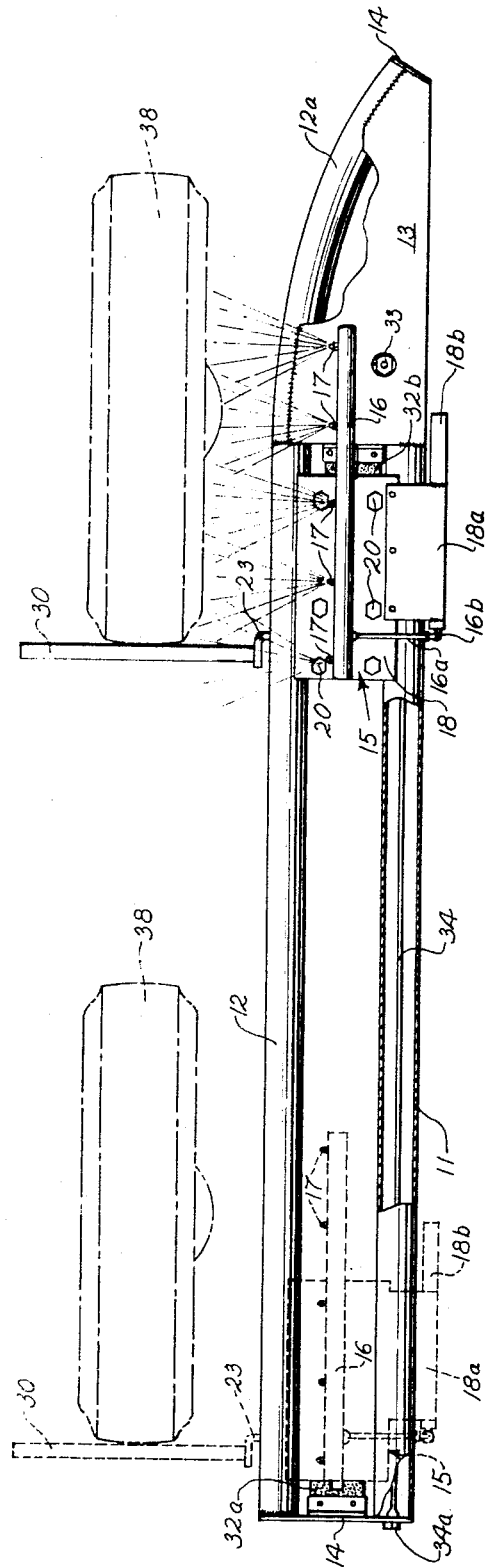
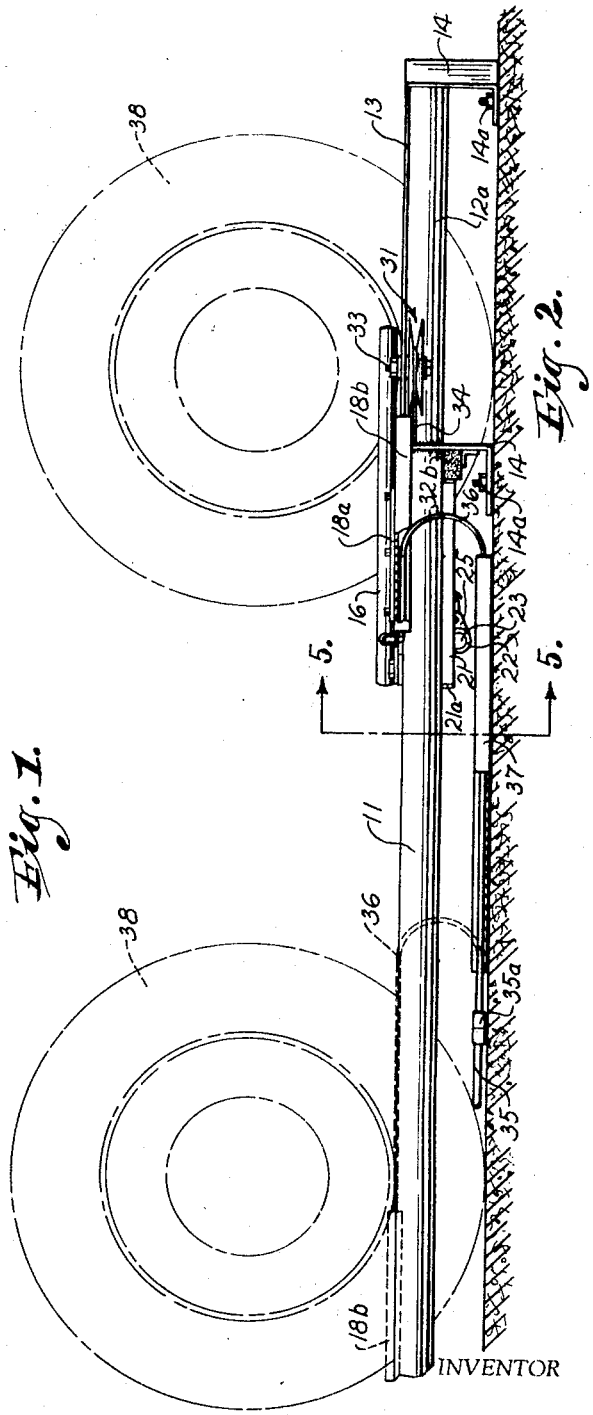
INVENTOR
George A. Collier
BY
*Scofield, Korjen, Scofield & Lowe*
ATTORNEYS INVENTOR
George A. Collier
BY
*Scofield, Kolker, Scofield & Lowe*
ATTORNEYS

United States Patent Office 3,446,217
Patented May 27, 1969

3,446,217
AUTOMATIC CAR WHEEL WASHING APPARATUS
George A. Collier, 10031 Fontana Lane,
Overland Park, Kans. 66207
Filed Sept. 26, 1967, Ser. No. 670,724
Int. Cl. B60s 3/04
U.S. Cl. 134—45                     10 Claims

ABSTRACT OF THE DISCLOSURE

A wheel washing apparatus which is usable in conjunction with automatic car washes. A car entering the wash stall institutes a wheel cleaning spraying action against the outside of the front wheels, same being continued until the car reaches a predetermined position with the stall. Upon reaching said position, the spray is directed against the rear wheels by movement of nozzle carriages to a position adjacent the rear wheels. The carriages' forward movement is facilitated by the front wheel contacting and moving laterally extending push rods, which pivotally connect with each carriage, until the predetermined position of each carriage is reached within the stall. These rods are then depressed to the floor, the wheels rolling thereover, and the carriages returned to the rear wheel spraying position.

BACKGROUND AND BRIEF DESCRIPTION OF THE INVENTION

Prior art car wash apparatus have included wheel washing means designed to follow the front wheels into a wash stall and then to be returned adjacent the rear wheels for further cleaning process. For example, the Guthrie Pat. No. 2,814,825, Cockrell Pat. No. 2,716,772 and Hurst Pat. No. 2,857,921 all show arrangements in which the wheel strikes a roller which is in turn connected with a spray means carriage. In each of these patents, however, the roller is pivoted about a vertical axis and operates to swing out of the way alongside of the wheel when the front wheel advances past the limit position for the carriage.

My invention relates to a wheel cleaning apparatus which is also usable in conjunction with automatic car washes. The apparatus includes a track structure which is positioned parallel to the path of entry of the car into a washing stall or bay and on each side thereof. A carriage is roller mounted on each track and movably carries spray nozzles which are pointed toward the side of the wheels. The forward end of each carriage has a pivotally mounted push rod extending laterally into the stall area and spaced above the floor into the path of the car wheels. As the car enters the wash bay or stall, the front wheels strike the push rods and move the rollers mounted carriages forwardly toward the front of the stall. At the forward end of the stall, the push rods, which are pivotally mounted on crank arms extending from the carriages, can be depressed to the floor level so that the front wheels will roll over same. Upon disengagement of the rods and wheels, elastic rubber tubing will pull each carriage back to the car entry end of their respective tracks. The carriages are now in a position to clean the rear wheels of the car with the push rod returning to its wheel contacting position against the forward surface of the rear wheels.

An object of the invention is to provide a uniquely constructed wheel washing apparatus which facilitates automatic wheel washing as the car is moved through a washing stall or bay.

A principal object of the invention is to provide in a wheel washing apparatus of the character described a pivotal push rod capable of moving spraying means adjacent the front wheels of a car, pivoting downwardly to the floor level at the forward limit position of the spraying means, and allowing the front wheels to run over the rods before returning the spray means to a washing position adjacent the rear wheels of the car.

A further object of the invention is to provide in a wheel washing apparatus of the character described a combination nozzle carriage and push rod construction that pivots about a horizontal axis and eliminates the need for holding means and trigger mechanisms heretofore required with wheel contacting rod-like structures that swing about vertical axes.

A still further object of the invention is to provide in a wheel washing apparatus of the character described a push rod connecting structure that allows the car to move either forward or backward thereon. My invention includes a unique inter-connection between the push rods and nozzle carriage so that either a purposeful or inadvertent movement of the car back over the push rods has no adverse effect on the apparatus, either at the forward or rearward end of the washing stall or by either the front or the rear wheels.

Another object of the invention is to provide in a wheel washing apparatus of the character described a cooperating tube holding track arrangement that facilitates the removal and laying in a flexible pipe as the carriage moves back and forth on its track structure.

Other and further objects of the invention, together with the features of novelty appurtenant thereto, will appear in the course of the following description.

DETAILED DESCRIPTION OF THE INVENTION

In the accompanying drawings, which form a part of the specification and are to be read in conjunction therewith, like reference numerals indicate like parts in the various views.

FIG. 1 is a top plan view of a typical unit (another unit consisting of substantially the mirror image of this one will be located on the other side of the wash stall) embodying the invention, the carriage and its push rod being shown in the initial or rearward position in solid lines and in the advanced or forward position in broken lines;

FIG. 2 is a side elevational view of the unit shown in FIG. 1;

Figure 3:
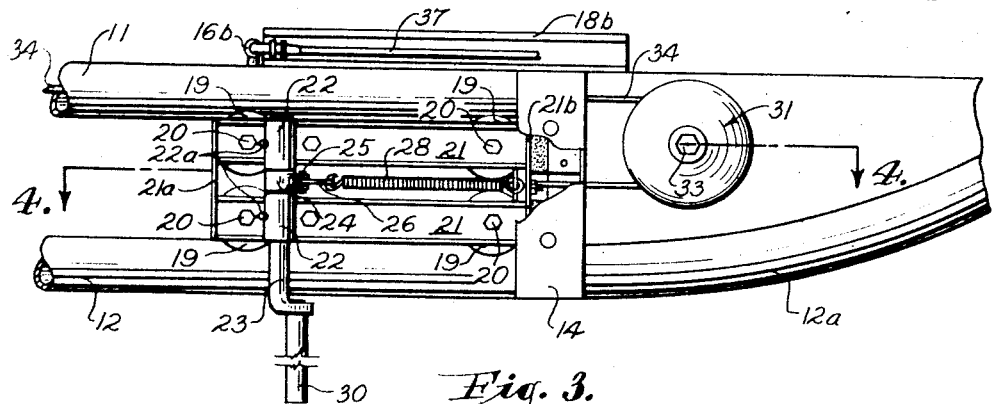
FIG. 3 is an enlarged fragmentary bottom plan view of the carriage and tube-like track at the rearward end of the unit.

Referring now more particularly to the drawings, the unit shown in FIG. 1 represents a wheel washing assembly which is capable of washing the wheels on the left hand side of a car. There will be two sets of wheel washers in each wash stall, one for the left hand side of the car and one for the right hand side, the units being mirror images of each other. This discussion, for explanatory purposes, will be limited to a single set or a single wheel washing unit, with the understanding that in actual practice both units may be and usually are desirable.

The single unit shown in FIG. 1 comprises a track structure generally indicated by the numeral 10 which is made up of two substantially parallel tubes 11 and 12. The rearward extension of tube 12 has a curved portion 12a which extends beyond the end extremity of tube 11 and eventually terminates in substantially the same vertical plane as that which bisects the length of tube 11. A steel cover 13 is welded to the rearward parallel end portions of tubes 11 and 12 and is contoured to follow the curvature of curved tube 12a, same being further welded along this length also.

The two tubes are secured to the floor of the wash stall by L-shaped brackets 14 and anchor bolts 14a located across each parallel end extremity. The end portion of tube 12a has an outwardly turned but more narrow bracket of a similar shape aiding with support of the rear of the unit. As clearly seen in FIGS. 2 and 4–6, the brackets support the tubes (tracks) in an elevated substantially horizontal plane above the floor.

Supported by the tubes and reciprocably movable along the longitudinal length thereof is a spray nozzle carriage 15. This carriage carries with it a spray tube 16 having nozzles 17 spacedly located along its length and directed inwardly. It is contemplated that carriage 15 will have an aluminum upper plate 18 and that spray tube 16 will be bolted thereto. Also a plumbing shield 18a is bolted to and extends outwardly from plate 18. A flexible channel tube guide 18b is welded to the outer end portion of shield 18a to facilitate the positioning of flexible plumbing discussed infra.

Figure 4:
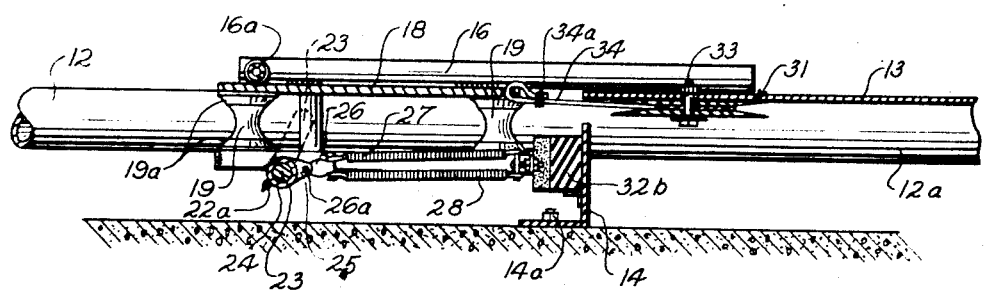
FIG. 4 is a sectional view taken generally along the line 4—4 of FIG. 3 in the direction of the arrows.
Figure 5:
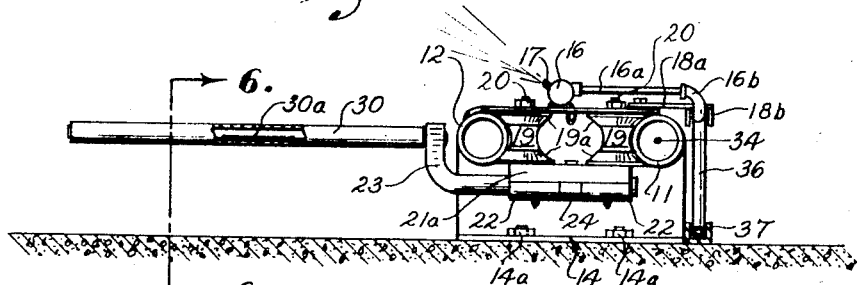
FIG. 5 is a sectional view taken along the line 5—5 of FIG. 2 in the direction of the arrows.
Figure 6:
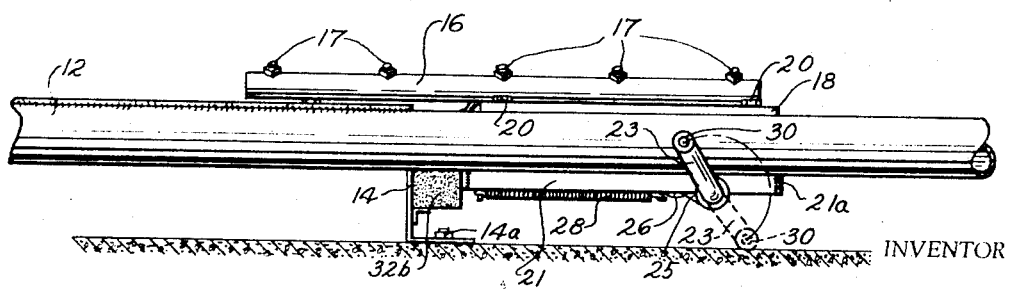
FIG. 6 is an enlarged fragmentary view taken generally along the line 6—6 of FIG. 5 in the direction of the arrows.

As suggested above, the reciprocating travel means for the carriage is provided by a roller structure shown in detail in FIGS. 3–5. The rollers 19 are bolted at 20 between upper plate 18 and a lower frame structure comprising two channel structurals 21. These structurals are weldedly connected into a rectangular rigid structure by fore and aft braces 21a and 21b, respectively. Rollers 19 include suitable lubricated bearings (not shown) which contact the shaft of bolt 20 for rotation thereon.

As more clearly seen in FIG. 5, each roller 19 has a relatively narrow arcuate surface 19a which bears against the inner facing surfaces of tubes 11 and 12. These relatively small contacting surfaces are lubricated and significantly reduce the frictional resistance to roller (and carriage) movement from that obtained by full roller contact.

Formed integrally with the two channel structurals 21 and at the forward end portion thereof, are horizontally aligned journal boxes 22. Each journal box has a grease fitting 22a located thereon for proper lubrication. A crank arm 23 extends through the aligned openings of the journal box, same being journaled therein for rotation on suitable bearings. The crank arm is also inserted through collar 24 which has a set screw or other means to affix the collar to crank arm 23 for movement therewith. As shown in FIG. 3, this collar is located between the two journal boxes, there being enough lateral space between the collar and the boxes to permit unrestricted rotative collar movement.

Mounting clevis 25 is fixedly connected to and extends outwardly from the center portion of collar 24. A spring connecting bracket 26 is pivotally affixed between clevis 25 by pin 26a. The rear end of bracket 26 is shaped with hook-like projections (FIG. 4) to allow connection with two vertically aligned springs 27 and 28. These springs are fixedly connected to bracket 29 which is in turn bolted to the aft structural brace 21b (see FIGS. 3 and 4) with a suitable lock nut arrangement 21c. Springs 27 and 28 effectively interconnect fixed bracket 29 and the rotative clevis 25 under tension so that the outer portion of crank arm 23 will, in its normal position, align more nearly in a vertical rather than in a horizontal plane.

A push rod 30 (cylindrical in shape, see FIG. 4) is swivelly mounted over horizontally extending rod 30a that is connected with the outer end portion of crank arm 23. Accordingly, the "swivel" motion of the rod eliminates binding and inadvertent pivoting when in contact with the car wheel. It will be seen that with the carriage in the forward limit position, the movement of push rod 30 and the rotating of the combined crank arm 23 and collar 24 (FIG. 4) in a counterclockwise direction, thereby swings clevis 25 upwardly and to the left so that both springs 27 and 28 are under more tension. With crank arm 23 (also push rod 30) unrestricted and free to assume its normal position, the tension on springs 27 and 28 will cause the crank arm to assume the position shown in FIG. 4.

As mentioned above, the middle bracket 14 is located across the end extremities of the parallel tubes 11 and 12. The vertical portion of this L-shaped bracket also acts as a partition that separates an idler pulley, generally indicated by the numeral 31, from the rearward position of carriage 15. As will be seen, pulley 31 locates elastic tubing (such as rubber surgical tubing) relative to carriage 15 to cause its return against a rubber stop shock absorber 32a. This shock absorber is either bolted or otherwise fixedly connected against the forward surface of the vertical portion of middle bracket 14 and is positioned to abut against the rear extremities of the carriage construction. Another rubber stop 32b is similarly affixed to the rear face of forward bracket 14 to cushion the forward thrust of the carriage.

Turning now more particularly to the return means for cariage 15, elastic rubber tubing 34 is fixedly connected to the forward bracket 14 adjacent the open end of tube 11 by a suitable means such as a combination hex-headed bolt and soldered concrete stud 34a. Tubing 34 extends from this fixed connection through tube 11 and into rotative contact with idler pulley 31. Pulley 31 is mounted for rotation about the bolt shaft of a nut-bolt combination 33, which extends through and depends from cover 13. The free end of tubing 34 extends through an aperture 14b near the upper portion of bracket 14 and is securely fastened through a centrally located aperture 18a in upper plate 18 of carriage 15 by clamp 34a. The elasticity of tubing 34 permits carriage 15 to be moved forwardly under tension. Pulley 31 optimally locates and positions the tubing, in both its stretched and retracted conditions, so that it functionally operates along its entire length. Further, because the turbing reacts along its entire length, its elasticity is preserved.

The cleaning fluid which is delivered to spray tube 16 is supplied by a conventional plumbing 35. Flexible pipe 36 is coupled to plumbing 35 by a conventional pipe coupling 35a (see FIG. 2). The flexible pipe is laid in channel track 37, same extending from near the pipe coupling 35a to the rearward position of carriage 15. The other end of the flexible pipe 36 then interconnects with a horizontal lateral 16a and a suitable elbow 16b and onto spray tube 16 so that the tube is continually supplied with the cleaning fluid regardless of the reciprocal movement of the carriage on its tracks (e.g. tubes 11, 12).

As mentioned above, a typical washing bay or stall will include a pair of the described wheel washing units. The entrance or rearward portion of the wheel washing unit has been curved to accommodate vehicle maneuvering prior to entry into the stall. As a car enters into the washing stall, the front wheels of the car will contact the two inwardly extending push rods 30. The remaining description of the subject wheel washing apparatus is, in the main, limited to a single wheel and its associated effect on the operation of the wheel washing apparatus, it being understood that a similar operation takes place on the other wheel. It is, however, possible that only side wheel washing is desired and utilized.

As seen in FIG. 1, the first position of the carriage and push rod assembly is the solid line position shown therein. In this case, the forward left wheel 38 moves into contact with push rod 30. An auxiliary device such as treadle arrangement, may be used to activate or turn on the spraying device at the proper time so that cleaning fluid from nozzle 17 will be sprayed against the outer surface of wheel 38. As the car moves forwardly through the wash stall, wheel 38 propels the carriage 15 forwardly on its roller-track assembly. The movement of wheel 38 against the swivelly mounted push rod 30 continues to move the carriage until the carriage reaches its limit position at the forward end of the track assembly. At this point, carriage 18 strikes the forwardly located rubber pad 32b and is precluded from further forward movement due to the rigid construction described supra.

As wheel 38 propels carriage 18 forwardly, rubber tubing 34 is being stretched along its length around pulley 31. Upon reaching the forwardmost carriage position, as shown in broken lines in FIG. 1, the tension on rubber tubing 34 is ready to cause the return of carriage 18 on its roller track structure were it not for the restricting presence of wheel 38. With the wheel in the push rod-carriage combination at its limit position, further forward motion of wheel 38 results in the counterclockwise pivoting of push rod 30 as seen in FIG. 4. The counterclockwise pivoting of rod 30 correspondingly rotates crank arm 23 in the same direction thusly moving clevis 25 and pin connected bracket 26 upwardly and to the left thereby applying greater tension to both springs 27 and 28. As wheel 38 moves still further, push rod 30 is pivoted to the floor level and wheel 38 will roll over same, thusly freeing the rod to respond to the normal forces resulting from the tensions on springs 27 and 28. The tensions on these springs then return crank arm 23 and push rod 30 to their normal position, that being the broken line position of FIG. 4 and the solid line position shown in FIG. 6.

Simultaneously with the returning of the push rod to its normal position, is the retraction of tubing 34 now that carriage 18 is no longer held at its forwardmost position. This action returns carriage 18 to its rearward position with tubing 34 moving rearwardly within pulley 31.

Upon reaching the rearward position, the rear wheel of the car (not shown) may come into contact with push rod 30 and the entire process be repeated with the washing operation now being directed adjacent the rear wheels of the car.

Due to the construction of the pivotal connection of crank arm 30 with the carriage, the car wheels may be moved in either a forward or rearward direction against push rod 30 without adverse affect to the structure. In this manner, if a car is inadvertently backed over push rod 30, the crank arm will pivot in a direction opposite to normal and springs 27 and 28 will cause a return of rod 30 to its normal position once the wheel is no longer contacting same.

The wheel spraying apparatus is designed to initially follow the front wheel during its path through the washing bay with the spray nozzles. As a result, when wheel 38 (or later the rear wheel) moves from the rearward position to the forward position of the washing apparatus, the carriage and related spray nozzles assume the correct location adjacent the outer surfaces of the wheel for washing purposes. The continuous and following type spraying is facilitated by utilization of flexible pipes connection with the conventional rigid plumbing system. For example, as the wheel 38 moves the carriage 15 forwardly, flexible pipe 36 will be lifted from channel track 37 and "channeled" into guide 18b thereby in no way restricting movement of carriage 15. Upon reaching the forwardmost carriage position, the flexible pipe assumes the position shown in broken lines in FIG. 2. When the elastic rubber tubing 34 urges the return of carriage 15, the flexible pipe 36 is laid back in channel track 37 from guide 18b so that the pipe will not interfere in any way with activity in and around the wash bay or with any of the moving parts of the apparatus.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be undersrtood that all matter herein set forth or shown in the accompanying drawings is to be interpreted as illustrative and not in a limiting sense.

Having thus described my invention, I claim:

1. An apparatus for washing vehicle wheels comprising
   a track assembly positioned parallel to the path of travel of a vehicle wheel,
   a carriage mounted for reciprocating movement on said track between a first position and a second position,
   a wheel spraying means located on said carriage for cleaning the wheel adjacent thereto,
   a push rod mounted on said carriage and contacting said wheel at said first position, movement of said wheel in a direction toward said second position thereby being capable of moving said rod and said carriage along said track to said second position, said push rod being swingable to a substantially floor level position at said second position thereby allowing said wheel to run over same, and
   a means for returning said carriage to said first position after said rod has been run over.

2. The invention as in claim 1 wherein said rod is pivoted about a horizontal axis through said carriage, and wherein at least a portion of said rod extends horizontally and substantially normal to the path of travel of said vehicle wheel.

3. The invention as in claim 2 wherein said rod is swivelly affixed on said horizontally extending portion.

4. The invention as in claim 2 wherein said rod is spring biased to return to its normal position above said floor level position, said rod being pivotally movable downwardly in either direction about said horizontal axis against said return biased condition.

5. The invention as in claim 4 wherein said track is comprised of two parallel spaced apart tubular members supported above the floor level, said carriage including a pair of vertically oriented rollers mounted on each side, each pair of said rollers being in frictional contact with one of the opposed inner side portions of said tubular members and movable thereon between said first and second positions.

6. The invention as in claim 5 wherein each of said rollers includes annular tubular member contacting portions of substantially smaller tube contacting area than the rollers profile adjacent said tubular members.

7. The invention as in claim 2 wherein said push rod includes a crank arm portion rotatively journaled within a portion of said carriage, said wheel movement at said second position being operable to cause rotative movement of said crank arm within said journal connection, a pair of springs connected between said arm and said carriage, said springs operative to bias said crank arm to assume a normal position, said movement of said crank arm in said journal connection away from said normal position thereby increasing the bias on said spring members.

8. The invention as in claim 2, including elastic tubing fixed at one end to said track assembly and having its other end portion attached to said carriage, said elastic tubing operable to stretch when said carriage moves from said first position to said second position and to urge said carriage to return to said first position when said carriage is free to move on said track assembly.

9. The invention as in claim 8, wherein shock absorbers are fixedly mounted on said track assembly at said first and second positions to cushion the movement of said carriage during its reciprocating movement between the two said positions.

10. The invention as in claim 9 wherein said wheel spraying means includes flexible pipe interconnected with spray nozzles located on said carriage, and cooperating means located adjacent said track assembly and on said carriage for locating and positioning said flexible pipe during the reciprocating movement of said carriage.

References Cited

UNITED STATES PATENTS

| | | | |
|---|---|---|---|
| 1,682,902 | 9/1928 | Gibson | 134—45 |
| 2,716,772 | 9/1955 | Cockrell | 134—45 XR |
| 2,761,170 | 9/1956 | Bonneau | 134—45 XR |
| 2,814,825 | 12/1957 | Guthrie et al. | |
| 2,857,921 | 10/1958 | Hurst | 134—45 |

FOREIGN PATENTS 1,239,203   4/1967   Germany.

ROBERT L. BLEUTGE, *Primary Examiner.*

U.S. Cl. X.R.

134—172